US012555907B1

(12) United States Patent
Marion et al.

(10) Patent No.: US 12,555,907 B1
(45) Date of Patent: Feb. 17, 2026

(54) INTEGRATED DUAL FREQUENCY BAND ANTENNA ASSEMBLY

(71) Applicant: BAE Systems Information and Electronic Systems Integration Inc., Nashua, NH (US)

(72) Inventors: Robert C. Marion, Pelham, NH (US); Randi J. McQuarrie, Salem, NH (US); Terry Faxon, Pepperell, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 209 days.

(21) Appl. No.: 18/480,952

(22) Filed: Oct. 4, 2023

(51) Int. Cl.
*H01Q 5/20* (2015.01)

(52) U.S. Cl.
CPC .................................... *H01Q 5/20* (2015.01)

(58) Field of Classification Search
CPC ............. H01Q 13/0275; H01Q 13/025; H01Q 13/02–06; H01Q 5/30–55
See application file for complete search history.

(56) References Cited

U.S. PATENT DOCUMENTS 4,096,482 A * 6/1978 Walters .................... H01Q 5/45 343/778
9,112,279 B2 8/2015 Montgomery et al.
9,748,665 B2 8/2017 Anderson et al.
9,912,073 B2 3/2018 Anderson et al.
11,489,262 B1 11/2022 Kralj et al.
12,015,184 B2 * 6/2024 Menargues Gomez . H01Q 3/26
2014/0111396 A1 4/2014 Hyjazie et al.
2021/0265740 A1 * 8/2021 Mitchelson .............. H01Q 5/47

FOREIGN PATENT DOCUMENTS

CN 217768712 U * 11/2022
EP 3537537 9/2019
EP 3357125 9/2020
EP 3790113 3/2023
GB 2479151 A * 10/2011 ......... H01Q 21/0037
GB 2540675 A * 1/2017 ......... H01Q 13/0208
WO WO-2010117474 A2 * 10/2010 ............... H01Q 1/42
WO 2020076918 4/2020
WO 2020119883 6/2020
WO 2022053156 3/2022

OTHER PUBLICATIONS

CN217768712U_Description_PDF (Year: 2022).*

* cited by examiner

*Primary Examiner* — Dameon E Levi
*Assistant Examiner* — Gurbir Singh
(74) *Attorney, Agent, or Firm* — Sand, Sebolt & Wernow LPA; Gary McFaline

(57) ABSTRACT

A radiator assembly has at least one dual frequency band antenna assembly (DFBAA). The DFBAA collocates two isolated frequency band antennas into a single volumetric space. A high-band antenna assembly (aperture and feed structure) is within the same or similar low-band antenna structure while improving gain and field-of-view angular coverage for both bands. There may be quad-ridges that define the low band antenna and a circular waveguide antenna that defines the high band antenna.

12 Claims, 16 Drawing Sheets

INTEGRATED DUAL FREQUENCY BAND ANTENNA ASSEMBLY

STATEMENT OF GOVERNMENT INTEREST

This invention was made with government support under sub-contract number N00019-19-C-1025 awarded by the Department of the Navy. The government has certain rights in the invention.

TECHNICAL FIELD

The present disclosure relates generally to an integrated dual frequency band antenna assembly.

BACKGROUND ART

Antenna systems or subsystems comprised of multiple apertures on vehicles or platforms for various applications has been designed at BAE Systems, amongst others, for decades. Some exemplary antenna schemes with multiple apertures are utilized as medium-low power transmitters and receivers. Each architecture presents unique challenges. Based on these challenges, implementing dual frequency band topologies into one physical antenna system requires significant engineering innovation.

SUMMARY OF THE INVENTION

Previously, the use of multiple radiators in a small cylindrical body created performance issues. Additionally, the requirements of antennas are expanding and require antenna assemblies to operate at wider and higher frequency ranges while maintaining broad fields-of-view. For example, it is now necessary for antennas to cover more than one frequency range. It is beneficial that this increased coverage in frequency range be accomplished without increasing size, weight and power of existing antenna assemblies. The embodiments of the present disclosure provide two antenna radiators (i.e., a dual frequency band antenna) within the same volumetric constraints of legacy antenna assemblies without increasing size, weight and power.

Various aspects of the present disclosure describe different embodiments of an antenna assembly that each provide a high-performance dual frequency band antenna assembly (DFBAA) solution. For some of these embodiments, the antenna assembly or antenna system collocates two isolated frequency band antennas into a single volumetric space. The volumetric space may be predefined by a legacy low-band (LB) system application. The various embodiments of the DFBAA described herein also provide a high-band (HB) key performance parameter (KPP). As stated, prior designs exist to meet only the low-band need. The embodiments described in this disclosure integrates a high-band antenna assembly (aperture and feed structure) within the same or similar low-band antenna structure while improving gain and field-of-view angular coverage for both bands.

The topology of some exemplary embodiments of the present disclosure uses two independent apertures that are collocated. There may be a HB antenna element located in the middle, near the middle, or eccentric to the middle of a LB quad-ridge antenna element. Both antennas may share a common radome. The LB antenna feed structure may be an integrated waveguide delta mode non-isolated combiner. There may be a ground probe, end launch, coax to waveguide transitions that are used for maximum thermal heat sinking of the center conductor. The LB antenna may support orthogonal linear polarizations. The orientation of polarization may be fixed relative to input feed connector locations without significant design impact. The HB antenna feed structure may be an integrated waveguide delta mode non-isolated combiner. The inputs are fed with equal amplitude and a 0/180 degree phase relationship. The HB antenna feed structure can be changed to a sum mode non-isolated combiner with equal amplitude and in phase relationship at inputs with minimal design impact if required. The HB antenna aperture may implemented as a circular open-ended waveguide with a stepped twist insert allowing the polarization to be oriented independent of the input feed orientation.

In one application embodiment the dual band antenna assembly is part of a towed decoy system for an electronic countermeasure application intended to protect an aircraft and its crew from harm. The antenna assembly is used to transmit signals and designed to steer incoming missiles away from an aircraft and to the decoy. Various countermeasures techniques can be transmitted simultaneously to effectively seduce an incoming projectile away from the protected aircraft. The use of the dual band antenna assembly in one example is intended to address radar-guided missile projectiles that operate in multiple bands including X/C/S/K/Ku and beyond.

In one aspect, an exemplary embodiment of the present disclosure may provide a dual band antenna assembly comprising: a radiator body including a front end and a rear end; a first antenna at the front end of the radiator body, wherein the first antenna is operative at a first frequency range; and a second antenna at the front end of the radiator body, wherein the second antenna is operative at a second frequency range that is greater than the first frequency range. In this exemplary embodiment or another exemplary embodiment, the first antenna is a LB quad-ridge antenna that may be formed or otherwise positioned at or near the front end of the radiator body, and the second antenna is an embedded HB circular waveguide antenna that may be formed or otherwise positioned at or near the front end of the radiator body. In this exemplary embodiment or another exemplary embodiment, a first ridge may defines a bore, wherein the HB circular waveguide antenna is within the bore of the ridge. In this exemplary embodiment or another exemplary embodiment, a first ridge may comprise a convexly curved surface defining a ridge radius that extends from the front end of the housing assembly to the throat of the LB quad-ridge antenna towards the back or rear end of the housing assembly; wherein the ridge radius is flared and sized to position the HB circular waveguide antenna within the ridge, and wherein the ridge radius is adapted to optimize the bandwidth of the LB frequency range.

In this exemplary embodiment or another exemplary embodiment, two of the four ridges of the LB antenna are spaced from each other less than 90 degrees relative to the primary axis. In this exemplary embodiment or another exemplary embodiment, the HB circular waveguide antenna may be located between the first ridge and the second ridge.

In this exemplary embodiment or another exemplary embodiment, there may be a non-conductive electrically absorptive ring disposed on the ledge between an inner surface of the radome and the outer surface of the radiator. In this exemplary embodiment or another exemplary embodiment, there may be a stepped twist insert within the bore of the HB circular waveguide antenna. In this exemplary embodiment or another exemplary embodiment, there may be a septum disposed within the bore of the HB circular waveguide antenna, wherein the septum divides the bore into two portions, wherein the septum is connected to the stepped twist insert. In this exemplary embodiment or another exemplary embodiment, there may be a non-conductive disc that covers the throat, wherein the non-conductive disc has an outer perimeter that is similar to a portion of the radiator, and wherein the outer perimeter of the non-conductive disc is interrupted by at least four cutouts that complement the four ridges of the LB quad-ridge antenna. There may be a flat frontal surface of the non-conductive disc, and a flat rear surface of the non-conductive disc. In this exemplary embodiment or another exemplary embodiment, there may be a choke located at or near the frontal portion of the bore. In this exemplary embodiment or another exemplary embodiment, there may be a high dielectric lens located at or near the frontal portion of the bore. Additionally, this exemplary embodiment or another exemplary embodiment may include a radome having an end that abuts a portion of the radiator, wherein the radome covers both the LB quad-ridge antenna and the HB circular waveguide antenna, and wherein the radome is frustoconical in configuration defining a flat frontal wall of the radome, wherein a thickness of the flat frontal wall of the radome is measured from a front surface to a rear surface of the flat frontal wall and the thickness is user selected to a value in a range from 0.005 inch to 0.05 inch.

In another aspect, an exemplary embodiment of the present disclosure may provide a method comprising: feeding a first signal within a first frequency range though a first antenna at a front end of a radiator; radiating the first signal from the first antenna; feeding a second signal within a second frequency range that is greater than the first frequency range through a second antenna at the front end of the radiator; radiating the second signal from the second antenna; and optimizing energy exiting the radiator by preventing frequency mismatch. This exemplary method or another exemplary method may further include determining a voltage standing wave ratio (VSWR) across a frequency band of interest; and lowering mismatch of the VSWR over the frequency band of interest. This exemplary method or another exemplary method may further include choking at least one of the first and second signals radiated from the radiator via one of an absorptive ring circumscribing the first antenna and a choke located in the second antenna; and wherein choking at least one of the first and second signals prevents signals from radiating backwards. This exemplary method or another exemplary method may further include controlling polarization of second signal by radiating the second signal along a step twist insert in the second antenna; and optimizing VSWR across a frequency band of interest of the second signal by frequency matching the signal with a plug in the second antenna.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
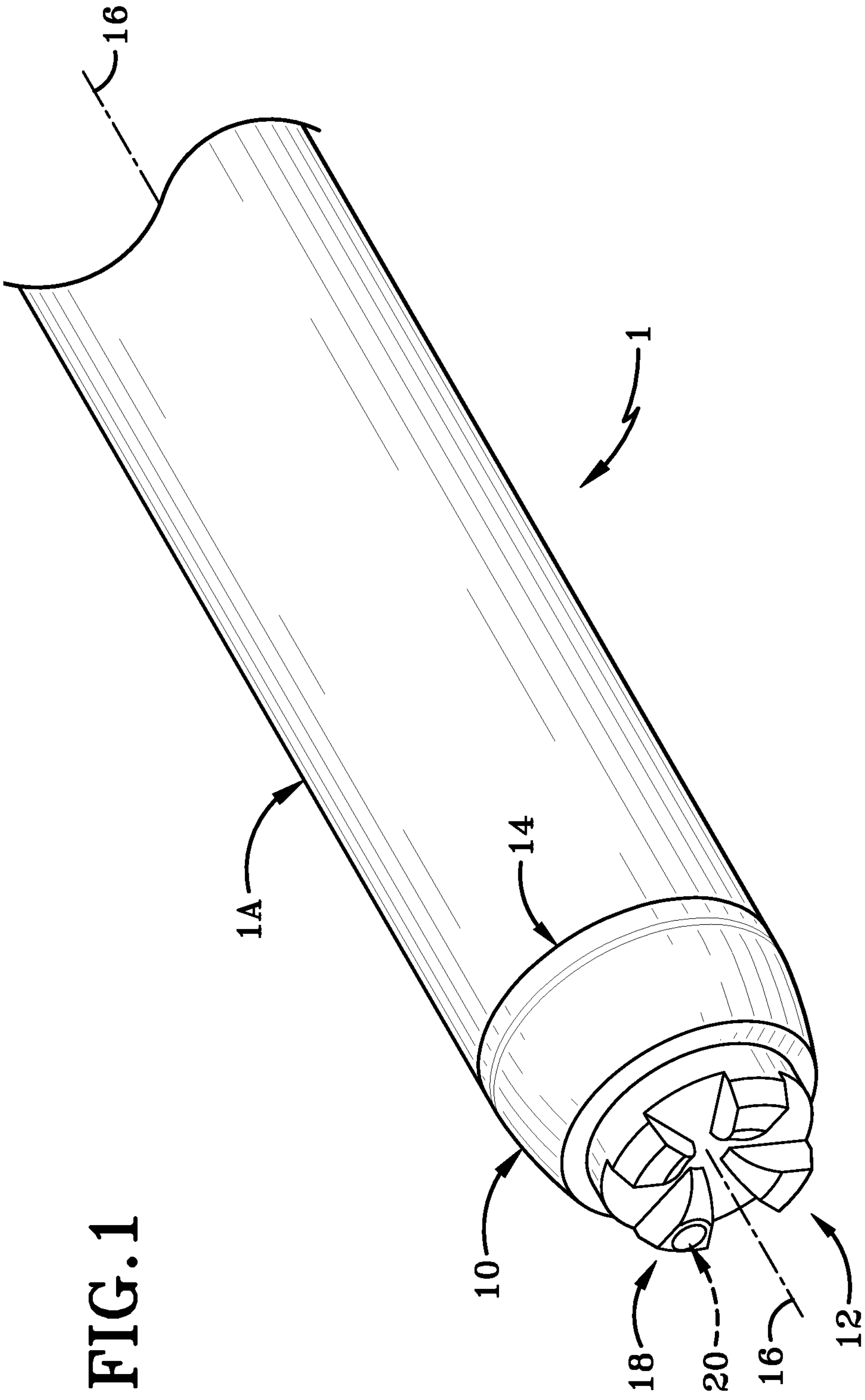
FIG. 1 (FIG. 1) is an isometric view of an radiator assembly having a first embodiment of an integrated radiator that is a dual frequency band antenna assembly (DFBAA) according to one aspect of the present disclosure FIG. 2 (FIG. 2) is an isometric view of a first embodiment of a DFBAA.
Figure 2:
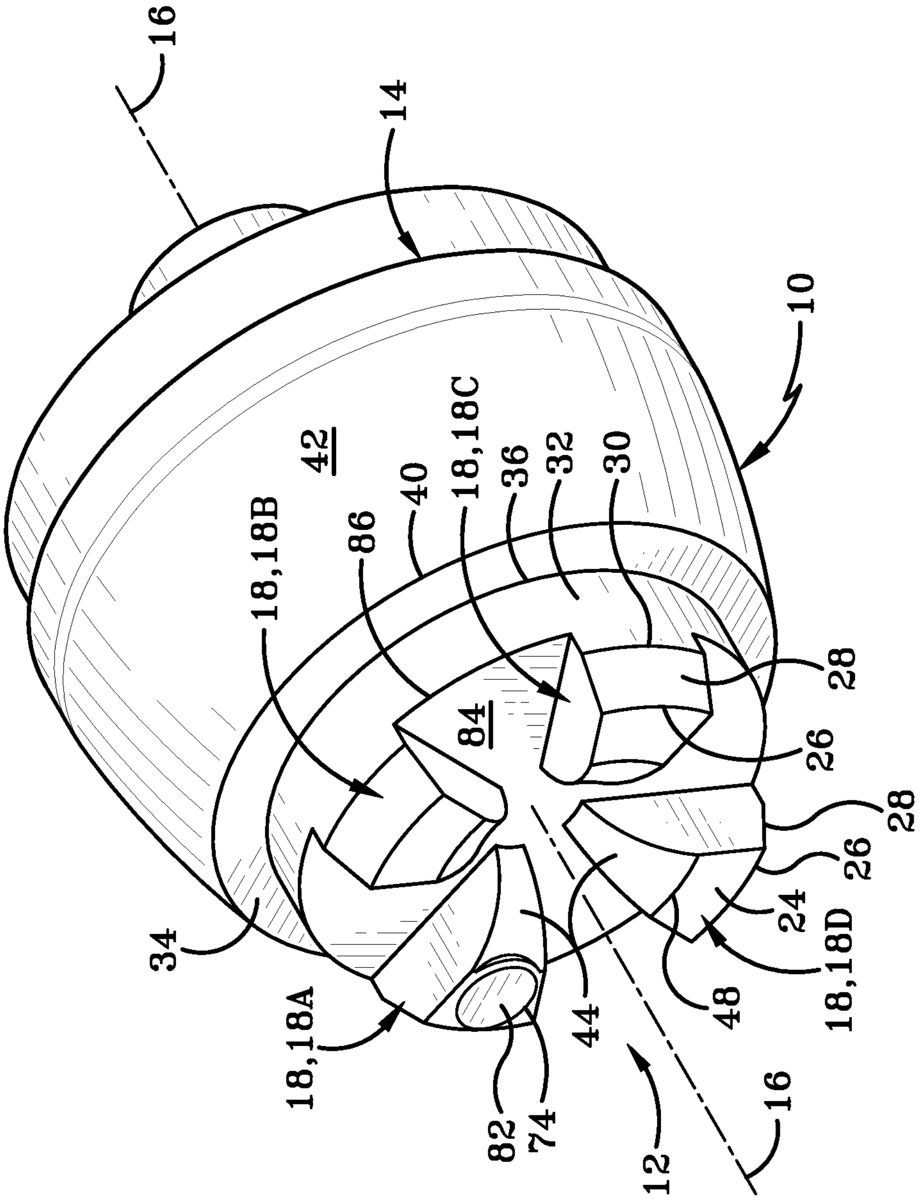

FIG. 1 depicts an integrated dual frequency band antenna assembly (DFBAA) 1. DFBAA 1 has at least one low band radiator 10 and at least one high band radiator 20. The present disclosure depicts a variety of different radiators that may be incorporated into DFBAA 1. DFBAA 1 may have a cylindrical body 1A of any selected length that extends from a first end to a second end (not shown). However, any body shape is possible. The body 1A may be formed of any material capable of supporting the low band radiator 10. Body 1A may be formed from any known material that is capable of being mounted and carried by a platform such that the radiator 10 is able to perform antenna functions or antenna operations. Body 1A is centered along primary axis 16. More particularly, when low band radiator 10 is respectively mounted to the body 1A, the DFBAA 1 is able to perform antenna operations using a low band antenna and a high band antenna without significantly interfering with each other.

In one embodiment, low band antenna 10 includes a plurality of ridges 18 on the frontal or first end 12 opposite a rear or back or second end 14. The primary center axis 16 extends centrally through the low band radiator 10 from the first end 12 to the second end 14. Low band radiator 10 is generally frustoconical in configuration and as such portions of the disclosure will be referenced as either axial (i.e., parallel to primary axis 16) or radial or radially relative to primary axis 16 (i.e., extending orthogonally relative to the primary axis 16). The low band radiator 10 integrates or incorporates the high band antenna 20.

Although the terms low band and high band are used with respect to the two antennas on DFBAA 1, it is to be understood that the physical configuration of DFBAA 1 uses two antennas with each of the antennas operating at different frequencies. As such, in the appended claims, the radiators, which are antennas, may be referred to as a first antenna that operates at a first frequency range and antenna 20 may be referred to as a second antenna that operates at a second frequency range that is different than the first frequency range. In one embodiment, the low band may have an operating radio frequency range of 30-100 MHz and the high band antenna may have an operating radio frequency range of 300-500 MHZ. In another scenario, the term "high band" may be used as a relative term to refer to a frequency range that is greater than that of the "low band" and not necessarily the aforementioned frequency ranges. For example, the term "high band" or second antenna 20 could refer to a traditional medium frequency range so long as the "high band" is greater than the operating frequency range of the low band or first antenna 18.

FIG. 2-FIG. 6 depict one particular embodiment that has a generally frustoconical configuration. Low band radiator 10 defines the low band (LB) antenna and the high band (HB) antenna or radiator 20 is at or near the front end or first end 12 of DFBAA 1. In this exemplary configuration, the low band radiator 10 is a quad-ridge antenna configuration that is also formed at the front end or first end 12 of DFBAA 1. Further, this example provides that the high band antenna 20 is a circular waveguide antenna formed and contained within the LB radiator 10.

The low band quad-ridge antenna has four ridges. Namely, a first ridge 18A, a second ridge 18B, a third ridge 18C, and a fourth ridge 18D. The ridges 18A-18D are spaced circumferentially around the primary axis 16 and collectively define a throat 22 of the quad-ridged antenna that extends though the low band radiator 10. In one particular embodiment, each ridge 18A-18D of the low band quad-ridged radiator 10 is formed from a solid conductive material.

Figure 6:
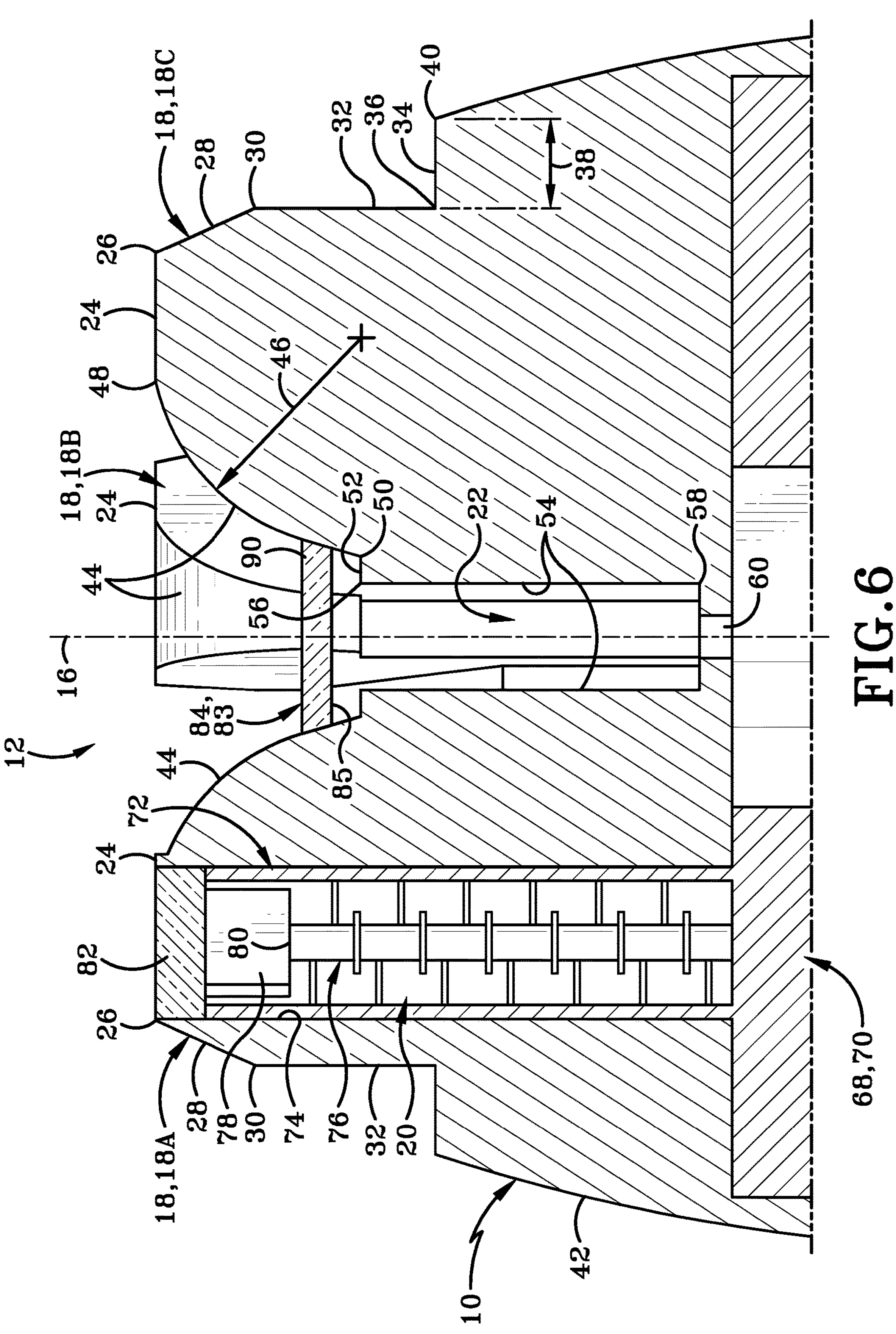
FIG. 6 (FIG. 6) is a cross section view of the first embodiment of the DFBAA taken along line 6-6 in FIG. 5.
Figure 7:
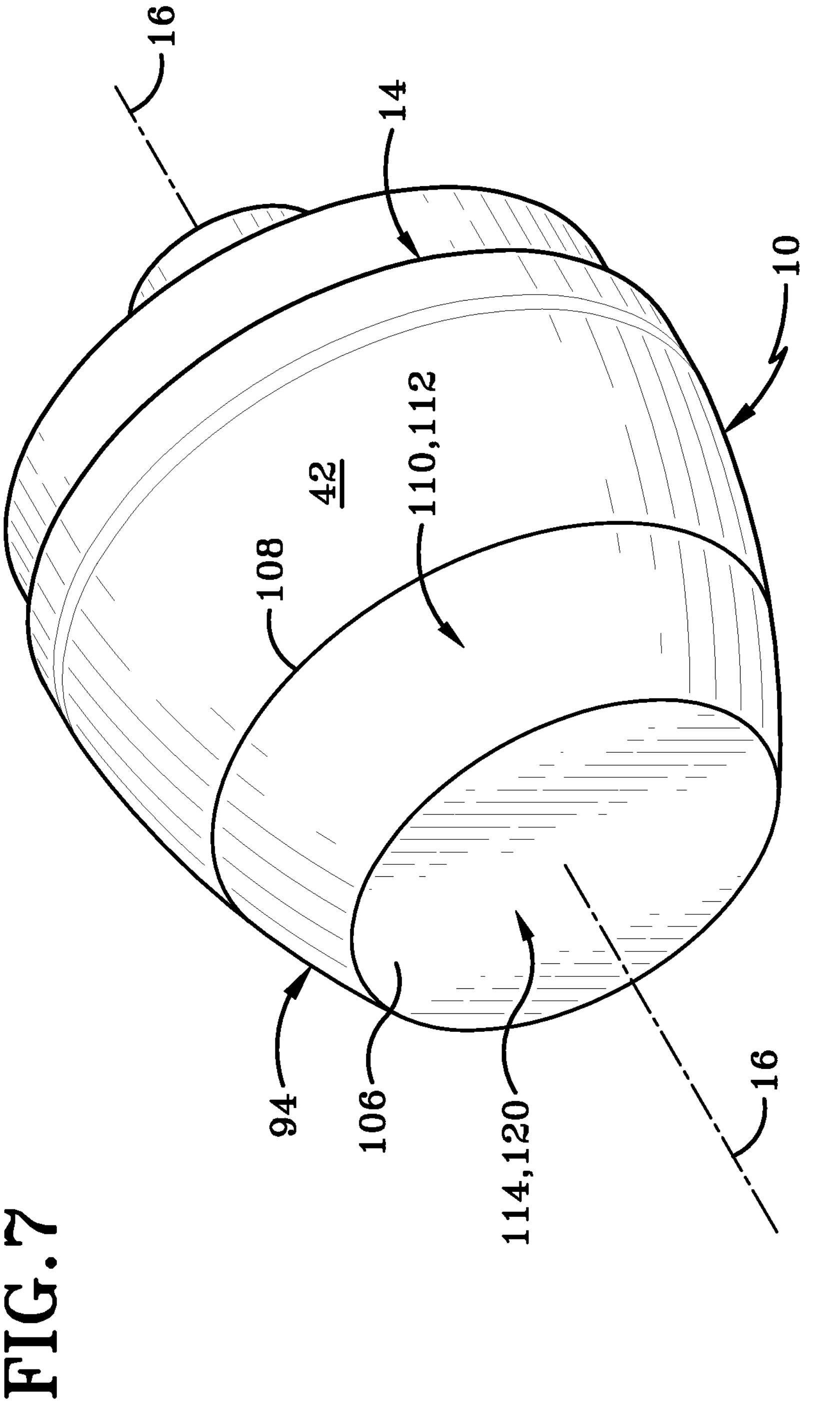
FIG. 7 (FIG. 7) is an isometric view of a second embodiment of a DFBAA shown with a radome cover and an absorptive ring below the radome (not visible).
Figure 8:
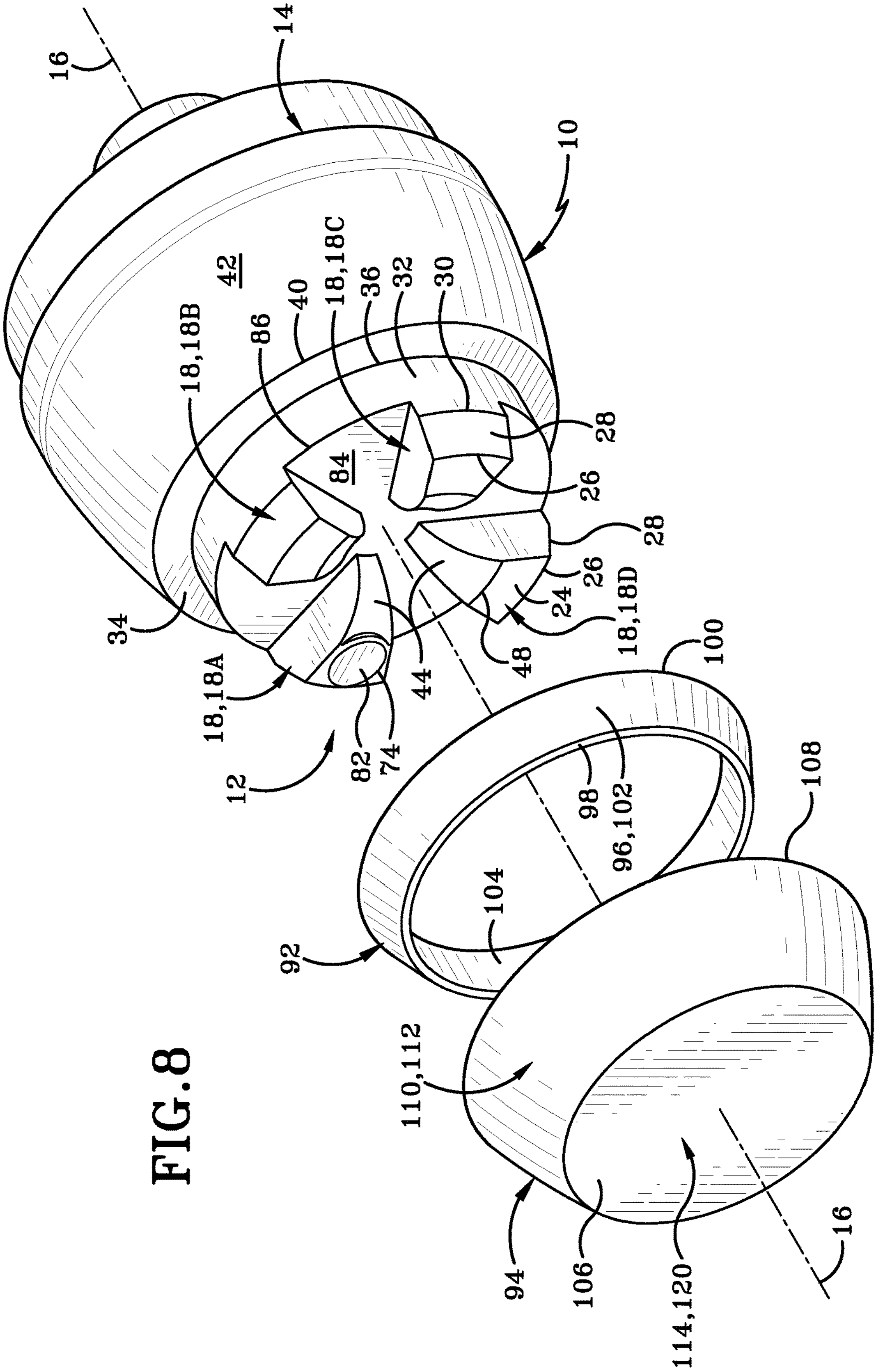
FIG. 8 (FIG. 8) is an exploded isometric view of the second embodiment of the DFBAA.
Figure 9:
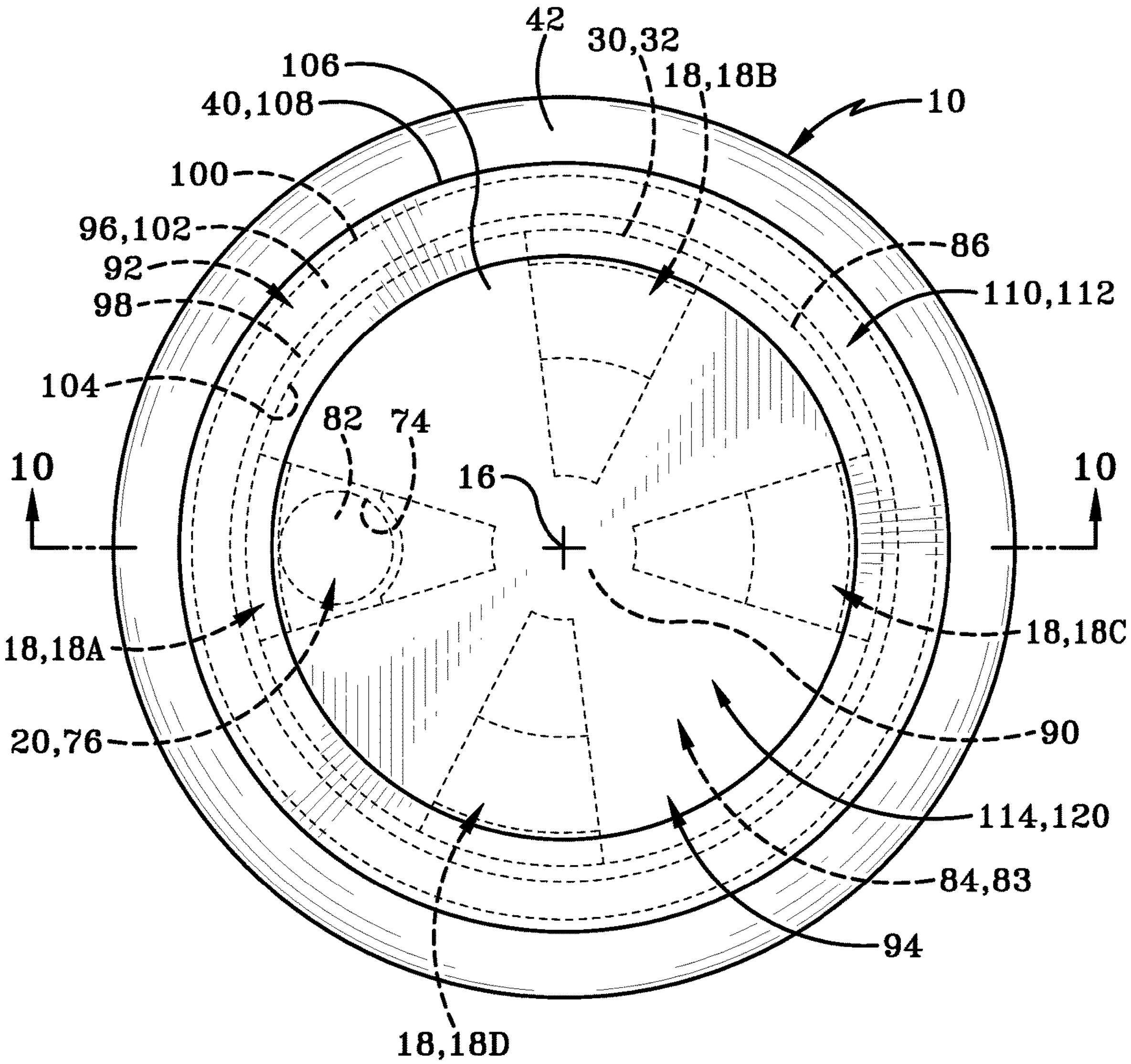
FIG. 9 (FIG. 9) is an end view of the second embodiment of the DFBAA.

As depicted in the cross-sectional view of FIG. 6, each ridge of the quad-ridged low band radiator 10 includes an outermost top terminal wall 24 that is substantially perpendicular to the primary axis 16 and radially offset from the primary axis 16. At the radial outermost edge 26 of the outer top terminal wall 24, a chamfer wall 28 extends radially away from the primary axis 16 and towards the second end 14. The chamfer wall 28 terminates at a corner 30. The orientation of the chamfer wall 28 relative to the primary axis 16 defines an acute angle. A circumferential sidewall 32 extends axially or parallel to primary axis 16 from the corner 30 towards the second end 14 until the sidewall 32 contacts a ledge 34 at corner 36. Ledge 34 has a width dimension or width 38 that is oriented perpendicular to the primary axis 16 (i.e., lies along a radial plane). The width 38 of ledge 34 is measured from corner 36 to outer edge 40. The radiator 10 includes a convexly curved sidewall 42 that extends from the outer edge 40 of ledge 34 towards the second end 14 of the radiator. The convexly curved sidewall 42 generally defines the frustoconical configuration of radiator 10.

Referring back to the outer top terminal wall 24 of each of the quad-ridges 18A-18D, a curved wall 44 may extend radially inward toward axis 16 in a convexly curved manner along a radius of curvature (i.e., ridge radius 46) to the throat 22. The radius 46 of curvature that defines the curve of curved wall 44 may be selectively varied during manufacture of radiator 10 depending on the application specific needs of DFBAA 1 for polarization optimization. Curved wall 44 extends between an outer end 48 that is coincident with the outer wall 24 to an inner end 50. An inner ledge 52 extends radially inward from the inner end 50 of the curved wall 44. Inner ledge 52 in perpendicular to primary axis 16. Inner ledge 52 may lie along a different radial plane that is perpendicular to axis 16 than ledge 34. The plane that inner edge 52 lies along is offset closer to first end 12 than the plane that ledge 34 lies along (which is closer to the second end 14). A throat wall 54 extends from corner 56 of ledge 52 to a second end 58. Throat wall 54 may be a cylindrical wall. The surface of throat wall 54 defines throat 22. A hole 60 is defined in the radiator 10 at the end of the throat 22.

Figure 5:
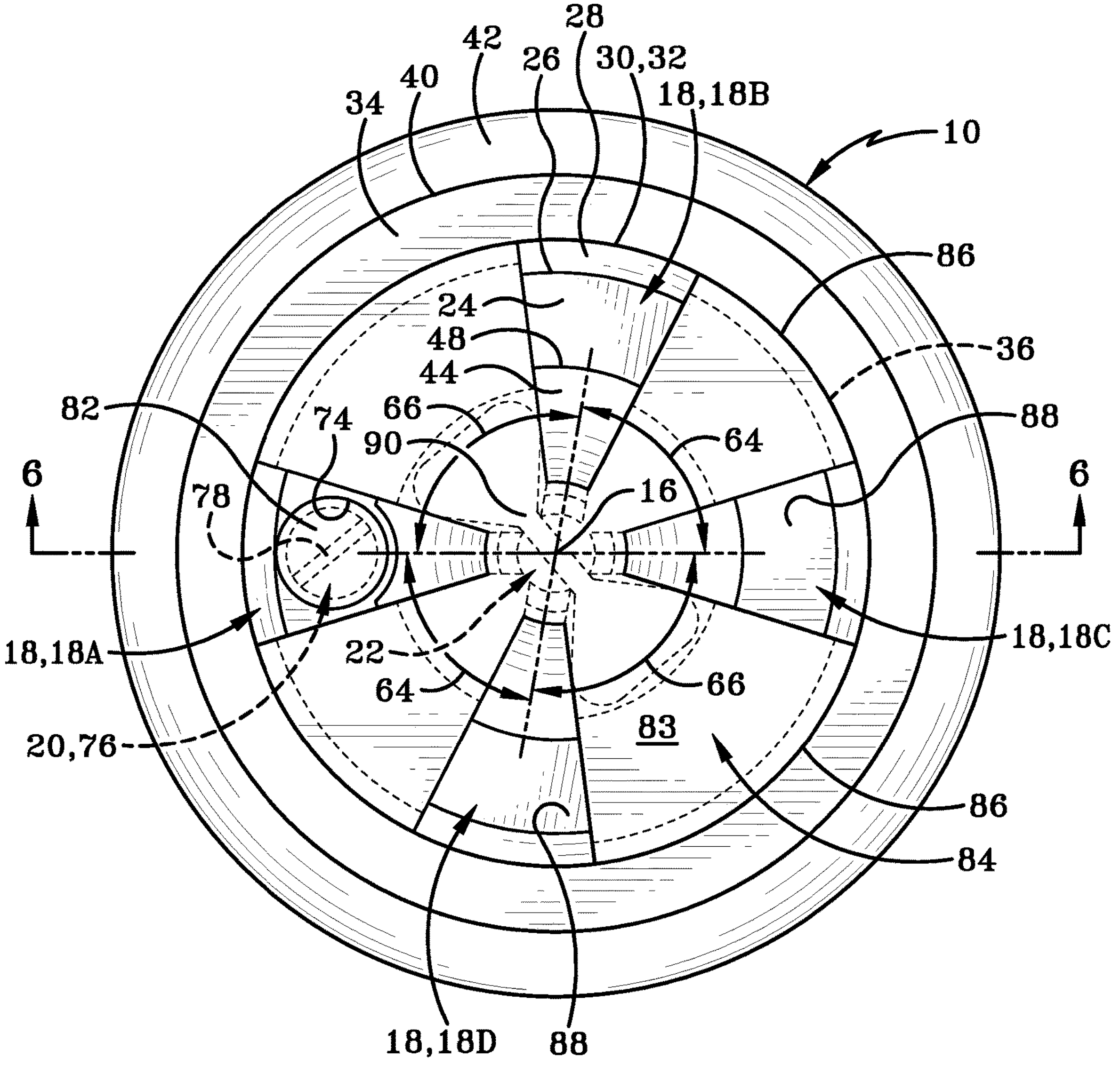
FIG. 5 (FIG. 5) is an end view of the first embodiment of the DFBAA.

With continued reference to the ridges 18, FIG. 5 depicts an exemplary embodiment of low band radiator 10 in which two of the four ridges 18 are spaced acutely relative to each other relative to the primary axis 16 and two of the four ridges are spaced obtusely relative to each other. In the shown configuration, the third ridge 18C and the fourth ridge 18D are obtusely spaced from each other as indicated by obtuse angle 66. Similarly, the first ridge 18A and the second ridge 18B are obtusely spaced from each other as indicated by obtuse angle 66. This embodiment also teaches that two or more of the ridges are spaced from each other by an angle less than 90 degrees relative to the primary axis 16. For example, as indicated by acute angle 64, the second ridge 18B is less than 90 degrees from the third ridge 18C, and the first ridge 18A is less than 90 degrees from fourth ridge 18D. The orientation of the ridges 18A-18D can be designed to meet the application specific needs required of the low band radiator 10. However, it is envisioned that by offsetting at least one of the ridges such that two ridges (i.e. the second ridge 18B and the third ridge 18C) are not orthogonal to each other by an angle less than 90 degrees this will optimize antenna performance of the low band radiator 10. Consequently, by orienting the second ridge 18B in this manner, the angle 66 between the first ridge 18A and the second ridge 18B is greater than 90 degrees.

The high band antenna 20 includes a structure 68 including a disc 70. The disc 70 is rigidly connected to a cylindrical member or cylindrical tube 72. The cylindrical tube 72 extends through one ridge of to define the high band circular waveguide antenna 20 that is formed at the front end or first end 12 of the low band radiator 10. Cylindrical tube 72 may be hollow to function as a waveguide antenna. The placement of the cylindrical tube 72 for the operation of the high band waveguide antenna 20 is shown in various different embodiments herein. Thus, while embodiments of low band radiator 10 largely include the same configuration of the plurality of ridges 18, variations of the different embodiments account for different structural orientations or placements of the high band circular waveguide antenna 20.

Figure 3:
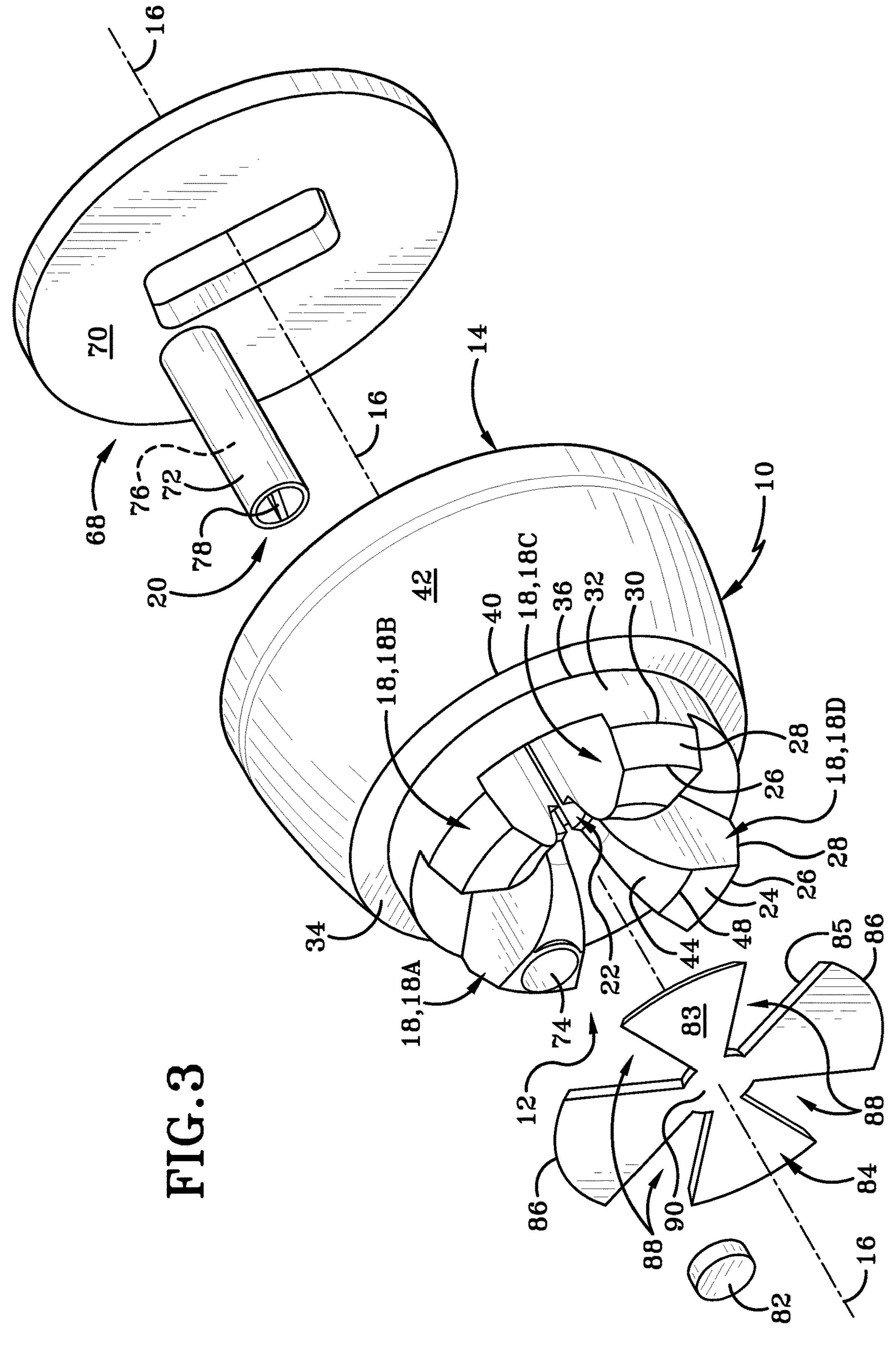
FIG. 3 (FIG. 3) is an exploded isometric view of the first embodiment of the DFBAA.
Figure 4:
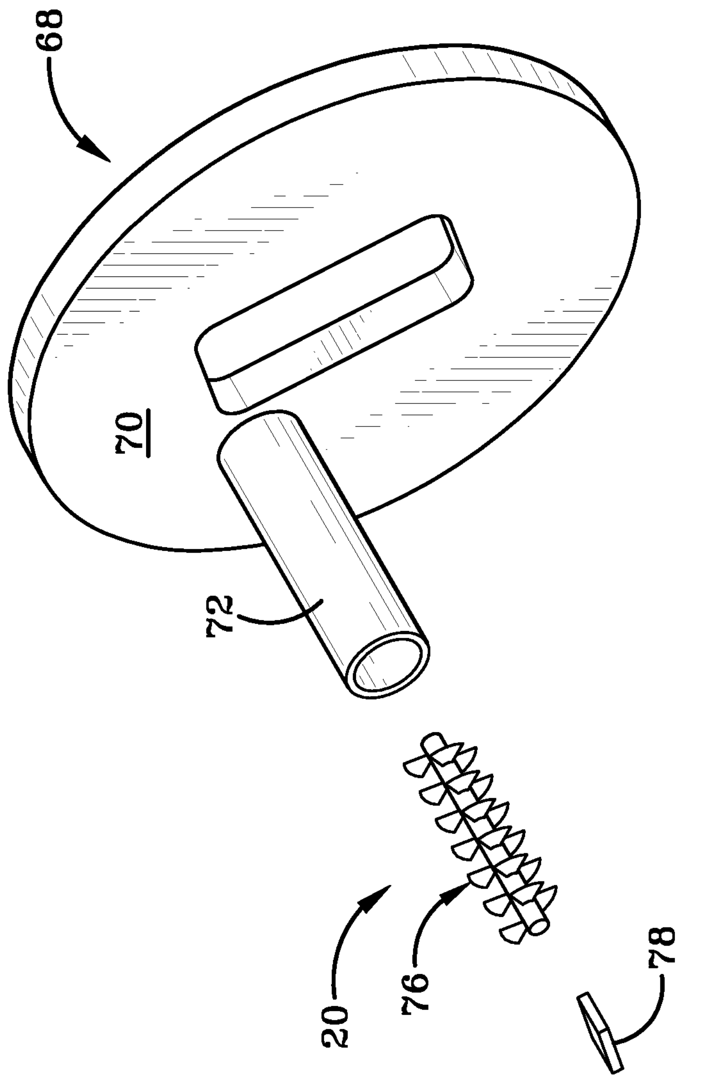
FIG. 4 (FIG. 4) is a simplified exploded isometric view of a high band antenna structure.

For example, FIG. 3 and FIG. 6 depicts an embodiment the DFBAA 1 in which the cylindrical tube 72 of the high band waveguide antenna 20 extends through a bore 74 defined in the first ridge 18A. The bore 74 extends fully through the low band radiator 10. More particularly, the bore 74 extends from the outer top wall 24 of the first ridge 18A to the rear surface of the low band radiator 10. The disc 70 nests against the rear surface of low band radiator 10 such that the cylindrical tube 72 is disposed within the bore 74.

Some embodiments of the present disclosure provide that the high band antenna 20 may include a stepped twist insert 76 that is disposed within the cylindrical tube 72 of the high band antenna 20. The stepped twist insert 76 has the shape generally of a spiral staircase and is formed from a metallic conductive material to effectuate the operation of the high band antenna 20 to have polarization diversity. A septum 78 may be connect to the stepped twist insert 76 and also be disposed within the cylindrical tube 72 as configured to divide a portion of the inner area of the cylindrical tube 72 into two portions. In the shown embodiment, the septum 78 is coupled to a terminal end 80 of the stepped twist insert 76. However, it is to be understood that the septum 78 may be placed at other locations or connect to other portions of the stepped twist insert 76 within the cylindrical tube 72 to effectively divide the center of the cylindrical tube into two portions. For example, the septum 78 may be oriented axially parallel relative to primary axis 16 to divide the tube 72 into two semi-circular halves. The size and placement of septum 78 may be optimized or selective chosen to improve frequency matching and boundary conditions. A non-metallic plug 82 may take the shape of a small cylindrical disc or plinth and be inserted into the bore 74 to cover the components of the high band antenna 20. In one particular embodiment, the plug 82 is formed from a non-metallic material such as a plastic to establish a dielectric disc. In this particular embodiment, the dielectric disc of plug 82 has a relative dielectric constant value of Er=2.5. Any type of non-conductive low dielectric material can be utilized.

Some embodiments may also utilize an inner member or disc 84 that is generally disc-like in shape however it has an outer circumferential edge 86 that is interrupted by cut-out regions 88 that are sized to accommodate the respective ridges 18A-18D such that a central portion 90 of disc 84 covers the throat 22. In one particular embodiment, the center portion 90 of disc 84 intersects the primary axis 16 at a perpendicular angle. The thickness of the disc 84 defined between the inner face or inner surface 85 and the outer face or outer surface 83. In one particular embodiment, the thickness of the disc 84 measured in the axial direction between the inner face or surface 85 and the outer face or surface 82 is approximately 0.3 inches. However, it is to be understood that the thickness of this disc 84 can be varied depending on the application specific needs of DFBAA 1. Further, while disc 84 may be formed from a Dyneema material, other non-conductive weave or non-weave materials are entirely possible for use in forming the disc 84. The same material may also be used to form plug 82. The material forming both the disc 84 and the plug 82 may act as a radome cover. Thus, while a radome is shown in later embodiments herein, the depicted embodiment does not utilize a separate radome because of the inclusion of the plug 82 and the disc 84.

With continued reference to disc 84, the outer surface 83 is flat and perpendicularly intersects primary axis 16. In another embodiment, the inner surface 85 is flat and perpendicularly intersect primary axis 16. In other embodiments, only one of the surfaces, either surface 83 or surface 85 is flat and perpendicularly intersect primary axis 16.

With continued reference to FIG. 6, it is seen that the low band radiator 10 is formed from a substantially solid and continuously uniform material. In the show embodiment, the material forming the low band radiator 10 is a conductive material, such as metal. However, other radiating materials could be utilized that are conductive to effectuate the signal propagation of the low band radiator 10 and the high band radiator or antenna 20.

Figure 10:
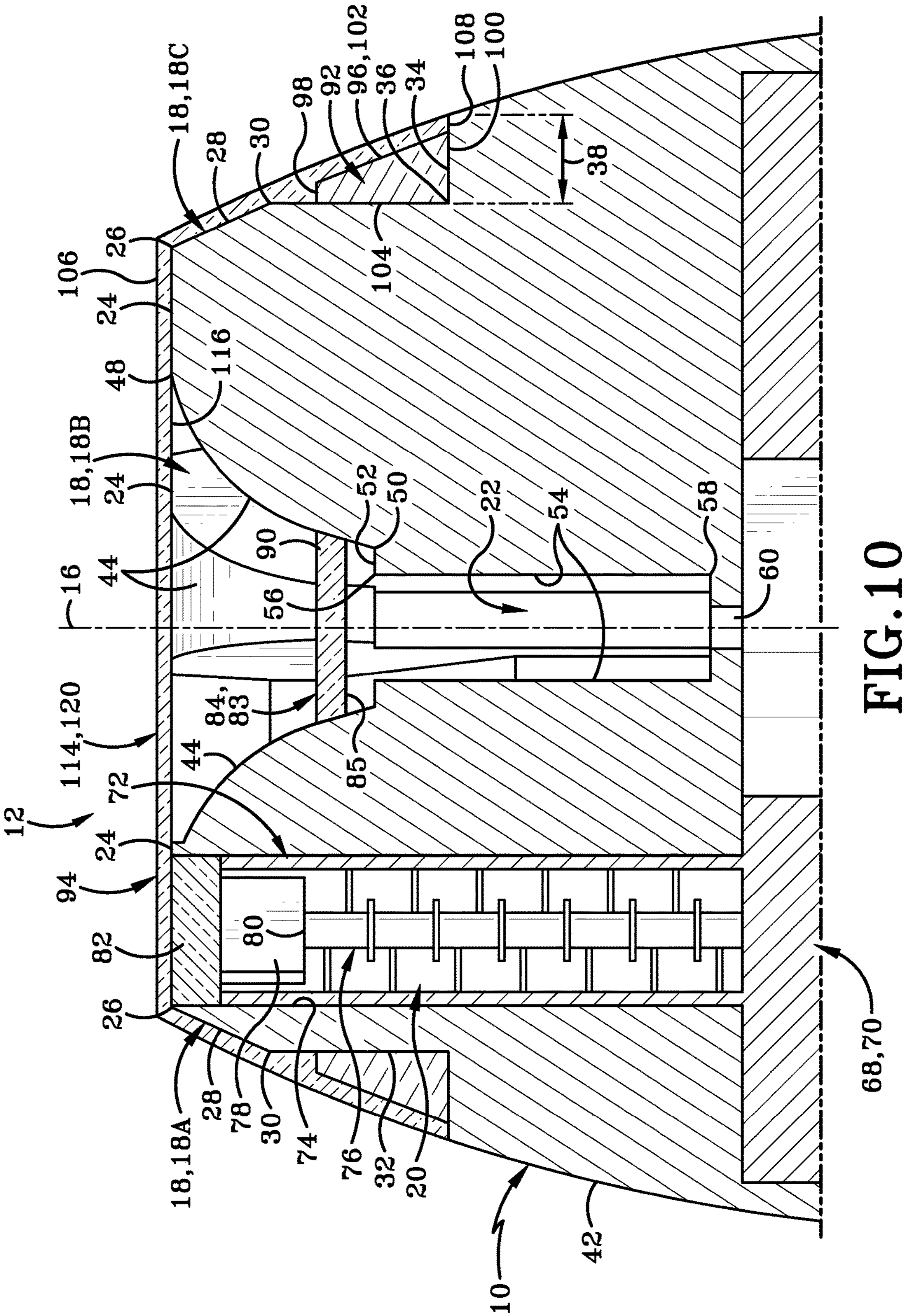
FIG. 10 (FIG. 10) is a cross section view of the second embodiment of the DFBAA taken along line 10-10 in FIG. 9.

FIG. 7-FIG. 10 depict another embodiment of radiator 10 that is used in conjunction with an absorptive ring 92 and a radome 94. Absorptive ring 92 is a generally annular member formed from a material that assists the low band radiator 10 with bandwidth performance and boundary conditions. Absorptive ring 92 is centered about a primary axis 16 and includes an annular sidewall 96 extending between first end 98 and second end 100. Sidewall 96 of absorptive ring 92 includes and outer surface 102 and an inner surface 104. As shown in FIG. 10, the second end 100 rests or contacts on ledge 34. The inner surface 104 contacts the sidewall 32 of some or all of the ridges 18. The inner surface 104 lies flat against sidewall 32 and as such it is parallel to primary axis 16. The outer surface 102 of absorptive ring 92 is curved relative to the primary axis in a manner that it maintains a curvature similar to that of sidewall 42.

With continued reference to the absorptive ring 92, it is formed from a non-conductive material that is optimized in shape and performance to improve bandwidth performance and boundary conditions of at least the low band radiator 10, but can improve bandwidth performance and boundary conditions of both the low band radiator 10 and the high band radiator or antenna 20. Stated otherwise, absorptive ring 92 is an electrically absorptive ring that circumscribes wall 32 and is supported by ledge 34 or otherwise rests on ledge 34. The manner in which the absorptive ring 92 is connected to ledge 34 can be accomplished in any known manner.

The first end 98 of the absorptive ring 92 may be positioned below (i.e. closer to the second end 14 when viewed in vertical cross-section) from the corner 30. The first end 98 is flat and oriented perpendicularly to primary axis 16. Similarly, the second end 100 is flat and oriented perpendicularly to the primary axis 16 such that it lies flat against the ledge 34. The width dimension 38 of the ledge is greater than the width dimension of the absorptive ring 92 at the second end 100.

With continued reference to FIG. 7-FIG. 10, the radome 94 includes a first end 106 and second end 108. The second end 108 of the radome 94 has a thickness that equals the width dimension 38 of the ledge 34 minus the width dimension of the second end 100 of the absorptive ring 92. End 108 abuts ledge 34. As such, the outer surface 110 of the sidewall 112 is conformal with the outer surface of sidewall 42 or curved wall 42 of radiator 10. Sidewall 112 is curved in a manner similar to curved wall 42 between the first end 106 and the second end 108 of radome 94. The first end 106 of the radome 94 is defined by a flat wall 114 that perpendicularly intersects the primary axis 16. The inner surface 116 of the flat end wall 114 is flat and contacts the outer wall 24 of each of the ridges 18. The inner surface 116 also contacts the outer surface of plug 82 in a flat contact relationship.

Radome 94 is generally frustoconical in configuration in which the flat frontal wall 114 of radome 94 defines one end of DFBAA 1. The thickness of the flat end wall 114 or flat frontal wall 114 of the radome 94 is measured from its outer surface 120 to its inner surface 116. In one particular embodiment, the thickness is in a range from 0.005 inch to about 0.05 inch, however the thickness may be optimized to meet the application specific needs of DFBAA 1. In one exemplary embodiment, radome 94 may be 0.030 inch thick on the face and approximately 0.040 inch on the sides.

Figure 11:
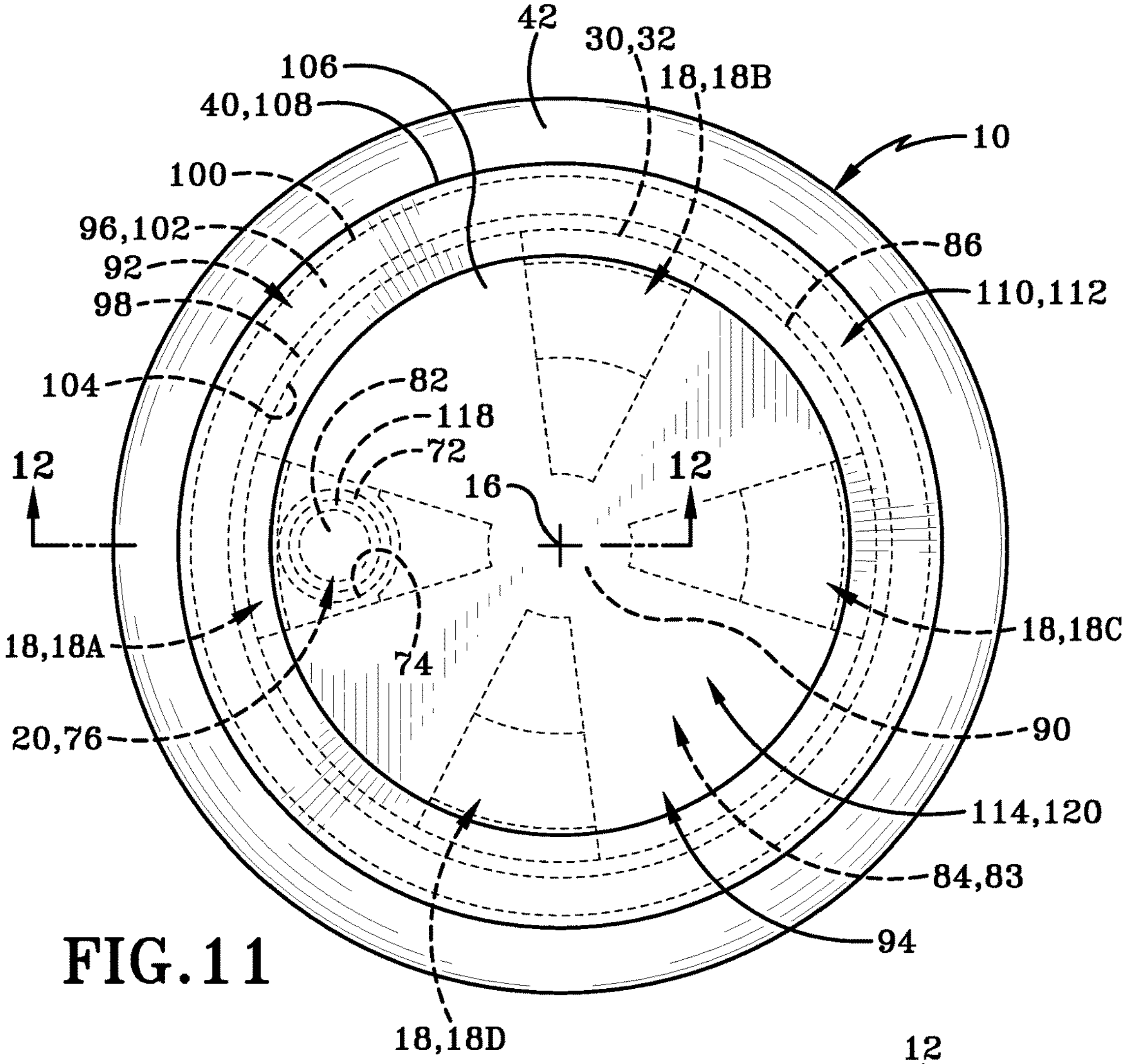
FIG. 11 (FIG. 11) is an end view of another embodiment of the DFBAA including a choke around the internal circumference of the high band structure.
Figure 12:
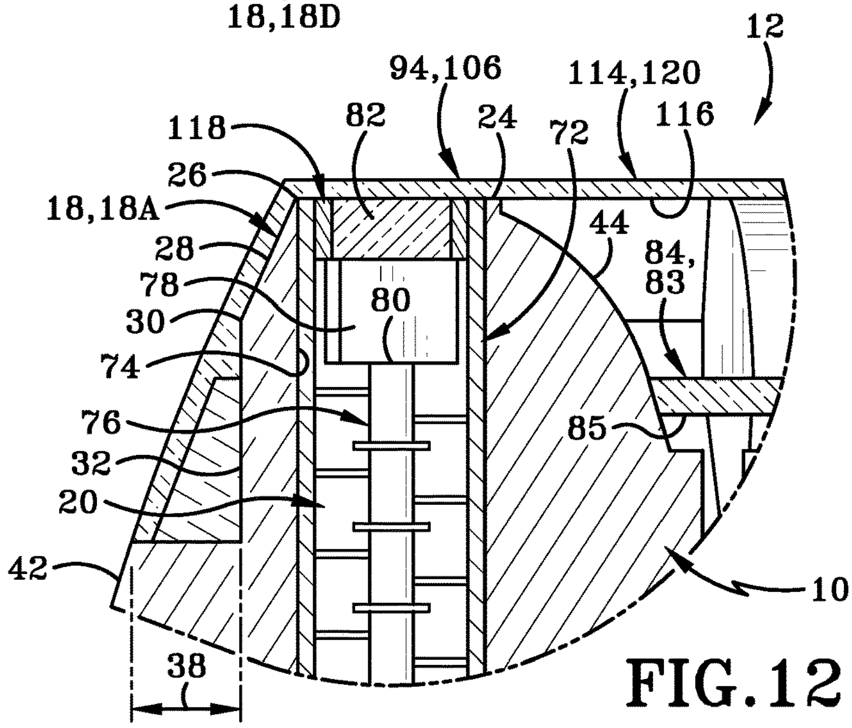
FIG. 12 (FIG. 12) is a cross section view of the embodiment of the DFBAA taken along line 12-12 in FIG. 11.
Figure 13:
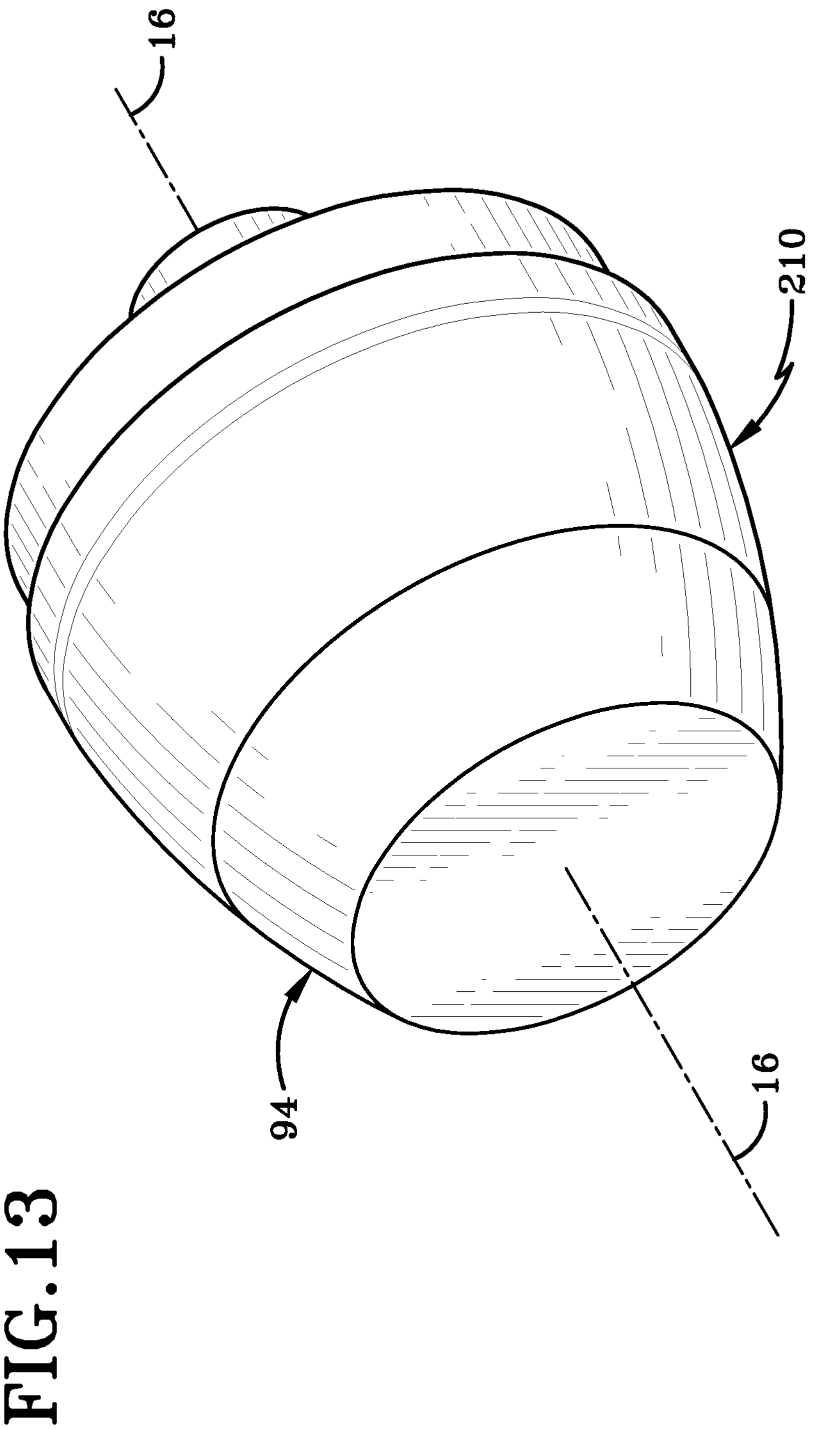
FIG. 13 (FIG. 13) is an isometric view of a third embodiment of a DFBAA shown with a radome cover and an absorptive ring below the radome (not visible).

FIG. 11 and FIG. 12 depicts another embodiment in which an annular HB element, such as a choke 118 is positioned in the bore 74 around tube 72 and below the radome 94. The choke 118 may circumscribe the plug 82. The bore 74 is sized to receive the choke 118 therein. The choke 118 is located at the forward end of the bore 74 such that the choke 118 is flush with the inner surface 116 of radome 94. The choke 118 may be of an outer diameter that is complementary or otherwise approximately equal with the inner diameter of the bore 74. Alternatively, the tube 72 may extend the fully length of the bore 74 and the choke may be inserted around the tube 72 at the frontal end, but may not extend the full length of tube 72. The inner diameter of the choke 118 may approximate or otherwise equal or complement the outer diameter of tube 72. The choke 118 is sized, shaped, and configured to assist the high band aperture 20 with optimizing the decoupling of the signal and isolation of the signal from the low band antenna.

FIG. 13 through FIG. 16 depict an alternative embodiment of the present disclosure in which the radiator 210 has both a low band antenna and a high band antenna, wherein the low band antenna is defined by a plurality of ridges 218 (i.e., ridges 218A, 218B, 218C, and 218D) and the high band antenna is defined by a circular waveguide antenna. However, in radiator 210, the high band circular waveguide antenna 220 is located between two of the ridges 218A and 218B rather than being formed inside of one of the ridges. Namely, a cylindrical tube 272 is located between the first ridge 218A and the second ridge 218B in a bore 274 through radiator 210.

Figure 14:
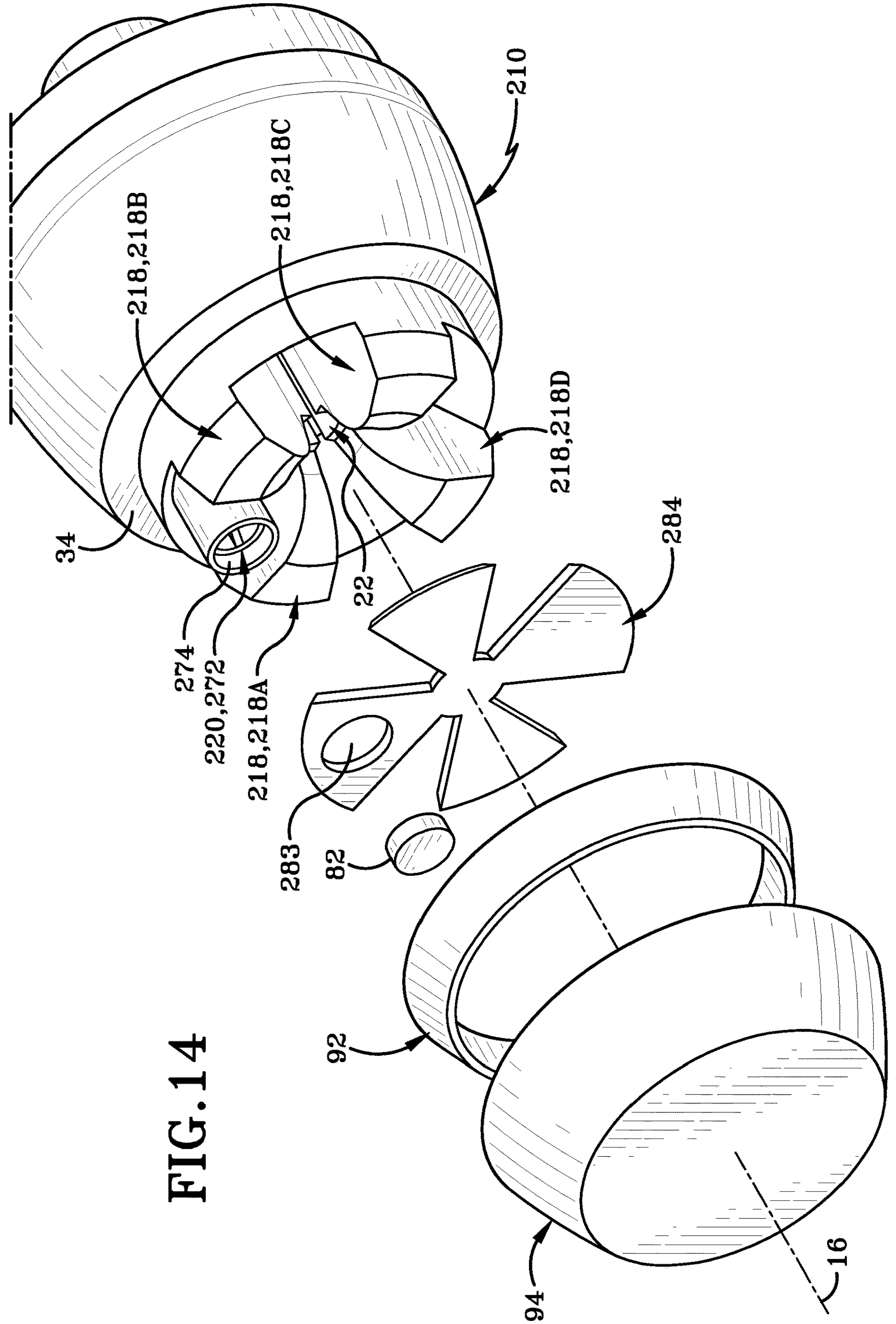
FIG. 14 (FIG. 14) is an exploded isometric view of the third embodiment of the DFBAA.
Figure 15:
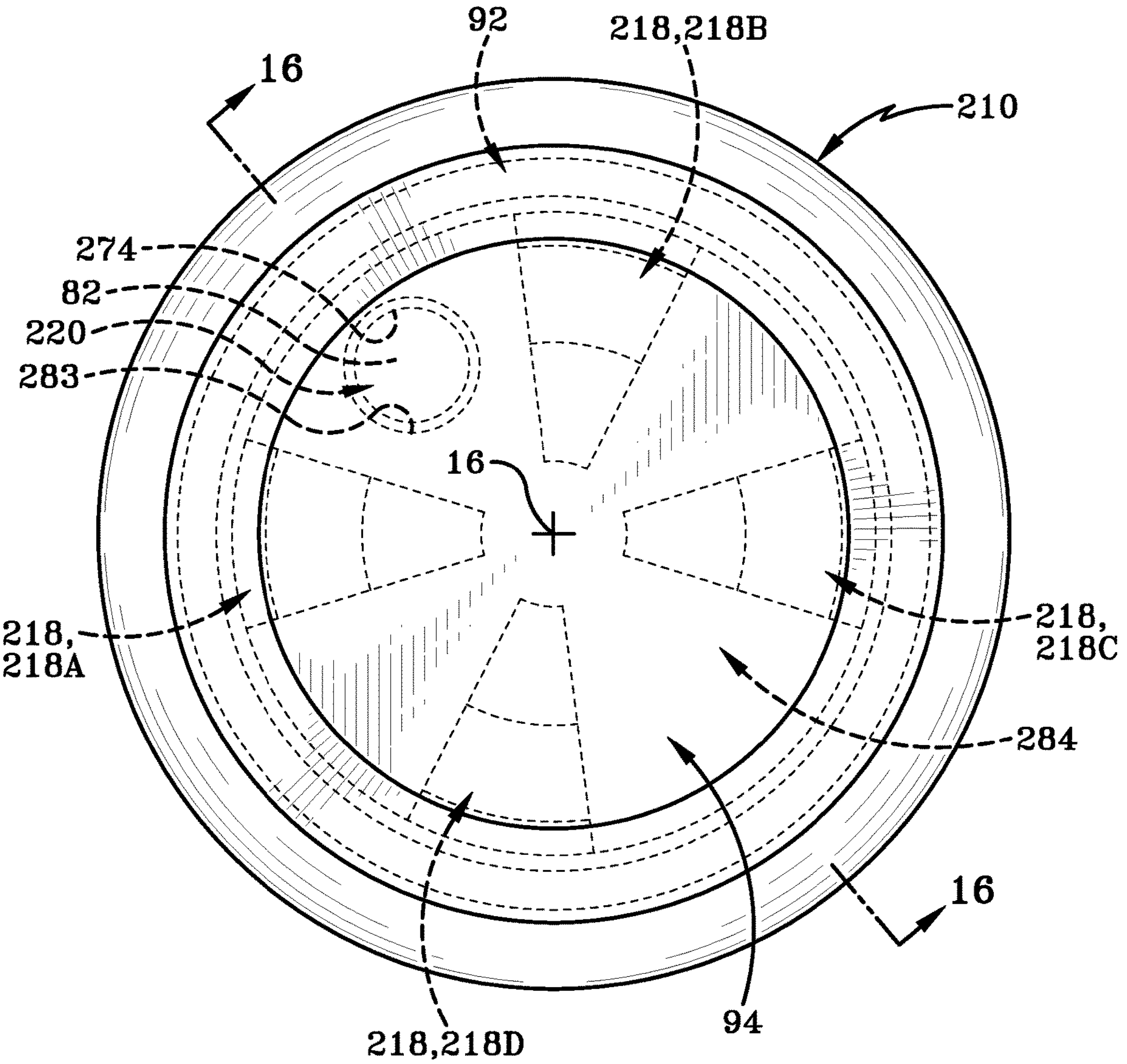
FIG. 15 (FIG. 15) is an end view of the third embodiment of the DFBAA.
Figure 16:
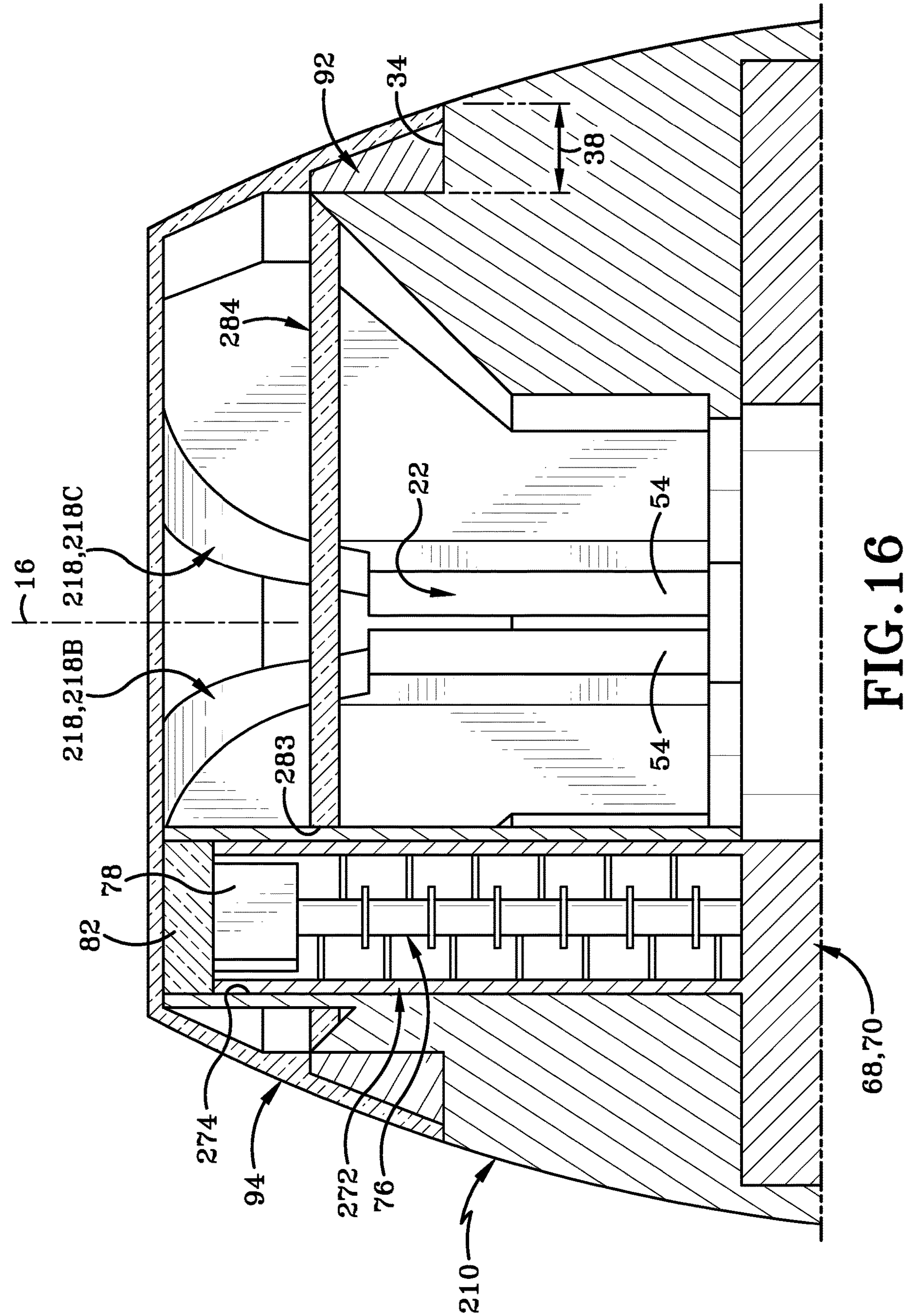
FIG. 16 (FIG. 16) is a cross section view of the third embodiment of the DFBAA taken along line 16-16 in FIG. 15.

FIG. 14 depicts that the disc 284 is shaped similar to disc 84 but has another cutout region 283 that is configured to extend around cylindrical tube 272 of the high band antenna 220 that is located between the first ridge 218A and the second ridge 218B. Similar to the other disc 84, disc 284 has a flat inner surface 85 and a flat outer surface 83.

Having thus discussed the exemplary configurations of the various embodiments of a radiator for DFBAA 1, reference will be made to its operation and its advantages.

The high band antenna, such as antenna 20 or 220, should have the high band aperture as close to the radome (if utilized) as possible.

The low band plurality of ridges 18 or 218 on the antenna 20 or 220 supports orthogonal linear polarizations. There may be an orthomode T (OMT) junction feeding the quad-ridged antenna. The high band feeds are orthogonal to the low band antenna from either side. Two of the four ridges 18 or 218 are in phase and equal in amplitude to ensure the correct quad-ridged mode is excited. There is a high band combiner OMT feed structure that is implemented in the waveguide for low loss and consistency of the four ridges of the low band antenna. The inputs for the high band antenna 20 or 220 are fed with equal amplitude and a 0/180 degree phase relationship. There may also be a low band combiner OMT feed structure with a grounded side probe that is launched with waveguide-to-coaxial transitions that are feeding a waveguide delta mode T. The low band inputs are fed with equal amplitude and a 0/180 degree phase relationship. The high band antenna 20 or 220 is implemented as a circular opening ended waveguide with a stepped twist insert. This allows the polarization to be oriented independent of the input feed orientation.

The radiator of DFBAA 1 of the present disclosure should be able to handle any continuous wave “CW” signals, pulse signals of any definition. As such, there is no modification needed to the input feed to the antenna assembly of the present disclosure from the existing legacy hardware.

The antenna radiators discussed herein comprise a solid metal frustoconical structure having a convexly curved annular sidewall. The material forming the frustoconical member is made of a conductive material, such as metal. The frustoconical member may also be generally referred to as a conductor. A ledge is defined in the exterior surface of the conductor. The ledge receives or is able to receive a radome. The radome 94 or 294 may be attached and connected adjacent the ledge 34 in any known manner. For example, the radome 94 or 294 may be glued or adhered to the ledge or a portion of the ledge or a sidewall adjacent the ledge may be threaded to allow the radome to be screwed onto the conductor and seated or nested with the ledge. The feed and the connectors for the conductor are formed or connected to the back-end thereof. The high band circular waveguide formed by the conductor are sized in order to match the desired frequency band of interest. Frequency band of interest can be selected by altering the design of various waveguide features of the conductor to meet application specific needs of the antenna assembly.

The inner disc 84 or 284 is used for matching frequencies. Depending on the frequency to be matched, the thickness of the inner disc 84 or 284 may be selected to match a desired frequency. The inner disc 84 or 284 is matched to the feed in order to prevent mismatch. Preventing mismatch sets a boundary so that the energy exiting the conductor is optimized. If there is a mismatch, then the energy will bounce back and not radiate optimally. Mismatching also refers to the scatter of energy in directions that are unwanted. In one particular embodiment the inner disc 84 or 284 has a relative dielectric constant value of Er=2.5. One exemplary material that would suffice for fabricating the inner disc is dyneema material that is a weave or layered non-conductive material.

In one embodiment, the inner disc 84 or 284 has a flat frontal surface 83 and flat rear surface 85. However, it is entirely possible for the front and rear surfaces of the inner disc 84 or 284 to be either concavely curved or convexly curve to meet application specific matching frequency requirements.

Each of the ridges 18 or 218 on the radiator has a ridge radius 46 that radially flares inwardly towards the throat of the low band antenna aperture. The ridge radius may vary depending on the application specific needs of the antenna assembly. For example, a system designer may choose to increase the radius of each respective ridge, then the frequency of which the antenna is to receive will change. Therefore, the DFBAA 1 of the present disclosure is optimized for a specific voltage standing wave ratio (VSWR) across the frequency band of interest. The ridge radius amongst other features, can be optimized to lower the mismatch or VSWR over the frequency band of interest. If the frequency band of interest is shifted, then a system designer could choose a different ridge radius to re-optimize the antenna assembly to lower the mismatch or VSWR for that particular chosen frequency band of interest that is shifted from the prior band of interest.

In some embodiments, the high band circular waveguide antenna may have a septum 78 within the HB cylindrical tube 72. The septum 78 is a conductor that is a thin metal piece, member, or element that has a similar diameter of the high band tube 72 and divides or separates the high band circular waveguide into two axial portions, namely a frontal portion and a rear portion (or a first half and a second half). The septum 78 is not physically connected to the feed however, it is influenced by the feed and needs to be matched to the frequency band of interest. In one particular embodiment, the septum is press-fit into the tube 72.

In some embodiments, there may be an absorptive ring 92 or 292 between the radome and the ledge. In one particular embodiment, the adsorptive ring 92 or 292 is formed from a conductive material, such as iron. The absorptive ring is used for choking backward radiated signals. Choking sometimes refers to controlling the antenna radiation. Stated otherwise, the absorptive ring is useful in choking or otherwise preventing signals from radiating backwards. The thickness, height, or shape of the absorptive ring is matched to the frequency band of interest and radome shape.

The stepped twist insert 76 may be a metallic member located within the tube 72 that defines the high band circular waveguide antenna. Generally, the high band step twist insert takes the shape of a spiral staircase and is disposed within the HB tube 72. The stepped twist insert 76 controls the polarization. The stepped twist insert 76 connects or mates with the septum located in the tube 72 of the cylindrical high band waveguide antenna. The size, shape, and number of stairs/steps/turns of stepped twist insert is optimized to improve polarization independency and frequency match. Additionally, with respect to the high band circular waveguide there may be a plug 82 that is used for frequency band matching to optimize VSWR that covers the end of the high band circular waveguide. In one particular embodiment, the aperture plug may have a diameter of 0.105 inches. The plug 82 may be press-fit into the end of the high band circular waveguide used to control environmental factors so that no dust, debris or fluid enters the throat or tube 72 of the circular waveguide.

The septum 78 and the stepped twist insert 76 are formed from the same metallic material as radiator 10. As the energy is propagating through the high band circular waveguide, it radiates in a certain polarization, such as the E-plane polarization that the feed propagates. Thus, the step twist insert 76 functions to twist that propagation around because the antenna assembly wants to optimize the polarization of the prorogating signal. Therefore, the step twist insert 76 eliminates the need to place the feed in a certain location physically. Now, because the step twist insert 76 enables the twisting of the polarization of the feed, the antenna can position the feed at different locations on the rear side of the radiator. Controlling this polarization is advantageous because it enables the high band antenna and the low band antenna to be isolated in the same physical space.

The antenna assembly of the present disclosure also may include a high-dielectric lens located at or near the frontal portion of the bore of the high band antenna that provides the benefit of controlling patterns. The high-dielectric lens functions to spread out or filter the energy across the azimuth and elevation angles that are of interest. Thus, the lensing material can be placed within the high band circular waveguide in front of the plug 82.

In another embodiment in which the HB circular waveguide is located between two ridges, the angles between the low band ridges are not necessarily orthogonal. This is because the high band circular waveguide is between two ridges to place the high band circular waveguide in the low band E-field. Thus, radiator 210 provides that the E-field of the low band can be significantly reduced or eliminated by placing the high band circular waveguide in a portion of the antenna that would not be seen by the low band aperture. Because the high band circular waveguide is in the low E-field, it effectively becomes transparent to the low band aperture. Thus, this configuration of radiator 210 helps to advance the purpose of the DFBAA 1 by placing the dual frequency band antennas in one physical embodiment but allowing the interaction between the low band and the high band to be minimized.

In some embodiments, two of the four ridges 18 or 218 may be placed with an 80 degree separation toward the low band E-plane. This positioning can be useful for midband pattern performance in the low band. The ridge radius 46 may be optimized to improve the high end of the LB pattern. Components of the DFBAA 1 that are further back in the throat 22 of the antenna appear to have little impact on patterns.

It will be understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Figure 17:
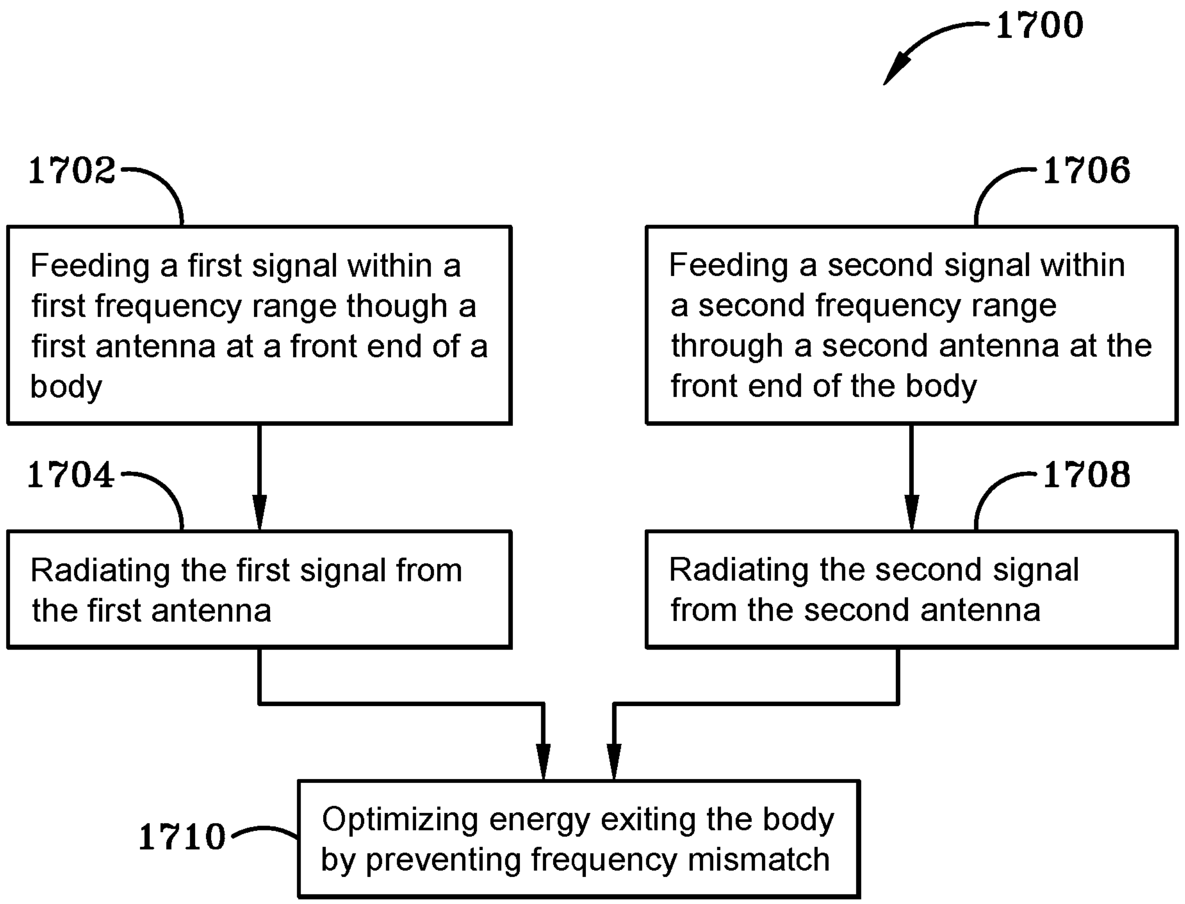
FIG. 17 (FIG. 17) is a flow chart depicting an exemplary process or method according to one aspect of the present disclosure.

FIG. 17 depicts an exemplary operative method of the one embodiment of the present disclosure generally at 1700. Method 1700 may include feeding a first signal within a first frequency range though a first antenna (such as ridges 18 or 218) at a front end 12 of DFBAA 1, which is shown generally at 1702. Method 1700 includes radiating the first signal from the first antenna, which is shown generally at 1704. Method 1700 includes feeding a second signal within a second frequency range that is greater than the first frequency range through a second antenna (such as antenna 20 or 220) at the front end 12 of DFBAA 1, which is shown generally at 1706. Method 1700 includes radiating the second signal from the second antenna, which is shown generally at 1708. Method 1700 includes optimizing energy exiting DFBAA 1 by preventing frequency mismatch, which is shown generally at 1710. Other aspects of method 1700 or otherwise detailed herein may include determining a voltage standing wave ratio (VSWR) across a frequency band of interest; and lowering mismatch of the VSWR over the frequency band of interest. Method 1700 or another method may further include choking at least one of the first and second signals radiated via an absorptive ring circumscribing the first antenna and a choke located in the second antenna, wherein choking at least one of the first and second signals prevents signals from radiating backwards. Method 1700 or another method may further include controlling polarization of second signal by radiating the second signal along a step twist insert in the second antenna; and optimizing a voltage standing wave ratio (VSWR) across a frequency band of interest of the second signal by frequency matching the signal with a plug in the second antenna.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, assembly, material, and/or method described herein. In addition, any combination of two or more such features, assemblies, materials, and/or methods, if such features, materials, and/or methods are not mutually inconsistent, is included within the inventive scope of the present disclosure.

All definitions, as defined and used herein, should be understood to supersede dictionary definitions, definitions in documents incorporated by reference, and/or ordinary meanings of the defined terms.

Portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The terms "radiator" and "antenna" are used herein synonymously or interchangeable to describe features that facilitate the transfer, transmission, or reception of energy, signals, or information.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A dual frequency band antenna (DFBAA) assembly comprising:

a radiator including a front end and a rear end, the radiator defining a first antenna at the front end of the radiator, wherein the first antenna is operative at a first frequency range;

a second antenna at the front end of the radiator, wherein the second antenna is operative at a second frequency range that is greater than the first frequency range;

wherein the first antenna is a low band (LB) quadrature ridge (quad-ridge) antenna formed at the front end of the radiator, and the second antenna is a high band (HB) circular waveguide antenna formed at the front end of the body, a ledge defined by an outer surface of the radiator, wherein the ledge circumscribes the low band (LB) quad-ridge antenna;

a radome having an end that abuts or is closely adjacent to the ledge, wherein the radome covers the LB quad-ridge antenna and the high band (HB) circular waveguide antenna; and an electrically absorptive ring disposed on the ledge between an inner surface of the radome and the outer surface of the radiator.

2. The DFBAA of claim 1, further comprising:

a first ridge that is one of four ridges of the LB quad-ridge antenna; and wherein the first ridge defines a bore, wherein the HB circular waveguide antenna is contained within the bore in the first ridge.

3. The DFBAA of claim 1, further comprising:

a first ridge that is one of four ridges of the LB quad-ridge antenna; and wherein the first ridge comprises a convexly curved surface defining a ridge radius that extends from the front end of the radiator to a throat of the LB quad-ridge antenna towards the rear end of the radiator; wherein the ridge radius is flared and sized to position the HB circular waveguide antenna within the first ridge, and wherein the ridge radius is adapted to optimize a high end of the first frequency range.

4. The DFBAA of claim 1, further comprising:

a primary axis of the radiator extending centrally from the front end to the rear end;

a first ridge that is one of four ridges of the LB quad-ridge antenna;

a second ridge that is one of four ridges of the LB quad-ridge antenna;

a third ridge that is one of four ridges of the LB quad-ridge antenna;

a fourth ridge that is one of four ridges of the LB quad-ridge antenna; and wherein two of the four ridges are spaced from each other less than 90 degrees relative to the primary axis.

5. The DFBAA of claim 1, further comprising:

a primary axis of the radiator extending centrally from the front end to the rear end;

a first ridge that is one of four ridges of the LB quad-ridge antenna;

a second ridge that is one of four ridges of the LB quad-ridge antenna;

a third ridge that is one of four ridges of the LB quad-ridge antenna;

a fourth ridge that is one of four ridges of the LB quad-ridge antenna; and wherein the HB circular waveguide antenna is located between the first ridge and the second ridge.

6. The DFBAA of claim 1, further comprising:

a cylindrical tube defining a bore of the HB circular waveguide antenna; and a stepped twist insert within a cylindrical tube of the HB circular waveguide antenna.

7. The DFBAA of claim 6, further comprising:

a septum disposed within the tube of the HB circular waveguide antenna, wherein the septum divides the tube into two portions, wherein the septum is connected to the stepped twist insert.

8. The DFBAA of claim 1, further comprising:

a bore defined by the HB circular waveguide antenna, wherein the bore has a frontal portion and a rear portion; and an aperture plug at or near the frontal portion of the bore of the HB circular waveguide antenna.

9. The DFBAA of claim 1, further comprising:

a throat of the LB quad-ridge antenna defined between four ridges; and a non-conductive disc that covers the throat, wherein the non-conductive disc has an outer perimeter that is similar to a portion of the radiator, and wherein the outer perimeter of the non-conductive disc is interrupted by at least four cutouts that complement the four ridges of the LB quad-ridge antenna.

10. The DFBAA of claim 9, further comprising:

a flat frontal surface of the non-conductive disc; and a flat rear surface of the non-conductive disc.

11. The DFBAA assembly of claim 1, further comprising:

a bore defined by the HB circular waveguide antenna, wherein the bore has a frontal portion and a rear portion; and a choke located at or near the frontal portion of the bore.

12. The DFBAA of claim 1, further comprising:

a radome having an end that abuts or is closely adjacent to the ledge, wherein the radome covers the LB quad-ridge antenna and the HB circular waveguide antenna; and wherein the radome is frustoconical in configuration defining a flat frontal wall of the radome, wherein a thickness of the flat frontal wall of the radome is measured from a front surface to a rear surface of the flat frontal wall and the thickness is in a range from 0.005 inch to 0.05 inch.

* * * * *